United States Patent [19]

Yoshimura et al.

[11] Patent Number: 5,130,201

[45] Date of Patent: Jul. 14, 1992

[54] VINYLIDENE FLUORIDE RESIN COMPOSITION

[75] Inventors: Tatsushiro Yoshimura; Nobuyuki Tomihashi, both of Takatsuki; Akira Chida, Settsu, all of Japan

[73] Assignee: Daikin Industries, Ltd., Osaka, Japan

[21] Appl. No.: 511,899

[22] Filed: Apr. 23, 1990

Related U.S. Application Data

[63] Continuation-in-part of Ser. No. 203,971, Jun. 8, 1988, abandoned.

[30] Foreign Application Priority Data

Jun. 9, 1987 [JP] Japan .................................. 62-143587

[51] Int. Cl.$^5$ ..................... C08L 27/16; C08L 63/00; C08L 33/12
[52] U.S. Cl. ..................................... 428/416; 428/414; 428/413; 428/421; 525/108; 525/121; 525/133; 525/143; 525/144; 525/155; 525/166; 525/167.5; 525/179; 525/183; 525/199
[58] Field of Search ............... 525/108, 121, 133, 143, 525/144, 166, 167.5, 179, 183, 199; 428/413, 414, 421, 416

[56] References Cited

U.S. PATENT DOCUMENTS

| | | | |
|---|---|---|---|
| 3,324,069 | 6/1967 | Koblitz et al. | 524/360 |
| 3,773,713 | 11/1973 | Koizumi et al. | 523/435 |
| 4,356,284 | 10/1982 | Kutnyak | 525/199 |
| 4,379,885 | 4/1983 | Miller | 525/108 |
| 4,556,589 | 12/1985 | Neumann | 428/520 |
| 4,659,768 | 4/1987 | Tortorello | 525/155 |
| 4,684,677 | 8/1987 | Higginbotham | 525/108 |

FOREIGN PATENT DOCUMENTS 38-4176 4/1963 Japan .
47-18345 5/1972 Japan .

Primary Examiner—James J. Seidleck
Assistant Examiner—David Buttner
Attorney, Agent, or Firm—Nikaido, Marmelstein, Murray & Oram

[57] ABSTRACT

A vinylidene fluoride resin composition which comprises (A) 10 to 95 parts by weight of a vinylidene fluoride resin, (B) 1 to 80 parts by weight of a resin having a poor compatibility with said vinylidene fluoride resin (A), and (C) 1 to 30 parts by weight of a resin having an excellent compatibility with both said vinylidene fluoride resin (A) and said resin (B), total amount of said resins (A), (B) and (C) being 100 parts by weight. The film obtained by baking the composition of the present invention has the structure that the surface side is rich in the VdF resin, and the excellent adhesion to the substrate. Consequently, the film has the excellent chemical resistance, adhesion to a substrate, and the like.

7 Claims, No Drawings

VINYLIDENE FLUORIDE RESIN COMPOSITION

This application is a continuation-in-part of application Ser. No. 203,971 filed Jun. 8, 1988 now abandoned.

BACKGROUND OF THE INVENTION

The present invention relates to a vinylidene fluoride resin composition suitable for use as a coating material and the like.

Japanese Examined Patent Publication No. 10363/1968 discloses that a coating composition composed of a vinylidene fluoride (hereinafter referred to as "VdF") resin and an acrylic resin as main components has hitherto been applied to uses requiring a weatherability or a chemical resistance, e.g., anti-corrosive coatings for facing, oil tanks, pipes and ducts, and the like. In the composition, the acrylic resin is incorporated for enhancing a surface gloss and an adhesion to a substrate of the obtained film. However, the films obtained by baking the composition is insufficient in a chemical resistance due to the mixed acrylic resin.

On the other hand, Japanese Examined Patent Publication No. 6176/1974 discloses a coating method that the VdF resin is coated onto an epoxy resin primer. However, the VdF resin is poor in the compatibility with the epoxy resin primer, therefore cracks tend to occur on the surface of the film.

Also, Japanese Unexamined Patent Publication No. 500988/1980 or No. 60756/1986 discloses that when tetrafluoroethylene resin is admixed with a polyamide imide resin or an epoxy resin and the mixture is baked, the portion adjacent to the substrate of the formed film is predominantly composed of the epoxy resin and the portion adjacent to the outer surface is predominantly composed of the tetrafluoroethylene resin, and the film surface becomes chemically stable. However, when the polyamide imide resin or the epoxy resin is admixed with the VdF resin, cracks tend to be formed on the film obtained from the mixture, the reason being based on the fact that the VdF resin is poor in the compatibility with the polyamide imide resin or the epoxy resin.

It is an object of the present invention to provide a VdF resin coating composition capable of giving films having the excellent adhesion to substrate and excellent chemical resistance and having no cracks on its surface.

This and other objects of the present invention will become apparent from the description hereinafter.

SUMMARY OF THE INVENTION

It has now been found that when two kinds of specific resins are admixed with the VdF resin to give a coating composition, the composition can give a film having a similar structure of layers to that of the film of the above-mentioned tetrafluoroethylene resin composition.

In accordance with the present invention, there is provided a vinylidene fluoride resin composition which comprises (A) 10 to 95 parts by weight of a vinylidene fluoride resin, (B) 1 to 80 parts by weight of a resin having a poor compatibility with the vinylidene fluoride resin (A), and (C) 1 to 30 parts by weight of a resin having an excellent compatibility with both the vinylidene fluoride resin (A) and the resin (B), the total amount of the components (A), (B) and (C) being 100 parts by weight.

DETAILED DESCRIPTION

In the present invention, as the VdF resin (A), a VdF resin containing not less than 75% by weight of VdF is preferred from the viewpoint of giving the chemical resistance to the obtained film. As the VdF resin (A), there can be used a VdF homopolymer, a copolymer of VdF with ethylenically unsaturated compounds, and the like.

Examples of the ethylenically unsaturated compounds are, for instance, ethylene, styrene, propylene, isobutylene, vinyl chloride, vinylidene chloride, vinyl fluoride, chlorodifluoroethylene, chlorotrifluoroethylene, tetrafluoroethylene, trifluoroethylene, trifluoropropylene, hexafluoropropylene, vinyl formate, vinyl acetate, vinyl propionate, vinyl butylate, acrylic acid, methacrylic acid, methyl methacrylate, methyl acrylate, allyl methacrylate, acrylonitrile, N-butyl methacrylamide, allyl acetate, isopropenyl acetate, and the like.

The VdF resin (A) can be prepared according to known manners as described in, for instance, Japanese Examined Patent Publication No. 9476/1971, No. 26820/1971, No. 21214/1971, No. 39592/1972 or No. 34484/1983, and the like.

In the present invention, the resin (B) which is poor in the compatibility with the VdF resin (A) is used. As the resin (B), it is preferable to use a resin (1) which softens and then is cured by heating at about 300° C. or which is hardened by cooling it after heating and (2) which has the tendency that, when baking its mixture with the VdF resin (A), a film in which two components are present in the state such as islands in a sea is not formed from the mixture, and a film in which two layers of the VdF resin (A) layer and the resin (B) layer exist is formed from the mixture.

Examples of the resins (B) are, for instance, an epoxy resin such as a bisphenol epoxy resin, a condensation product of phthalic anhydride with epichlorohydrine, diglycidyl ester of methyl tetrahydrophthalic acid, diglycidyl ester of hexahydrophthalic acid or polyoxyethylene diglycidyl ether; a phenol resin such as a resol phenol resin or a novolak phenol resin; an amino resin such as melamine resin or benzoguanamine resin; an alkyd resin; a polyamide imide resin; an urea resin; a vinyl chloride resin; and the like. The resins (B) are not limited thereto. Also, the resins (B) may be used alone or as an admixture thereof.

In the present invention, the resin (C) which is excellent in the compatibility with the resin (A) and the resin (B) is used. A resin having a softening point of 50° to 300° C is preferred, and for example, an acrylic resin or a methacrylic resin can be used as the resin (C).

Examples of the acrylic or methacrylic resins used as the resin (C) are, for instance, polymers containing, as a main component, a methacrylic resin such as polymethyl methacrylate, polyethyl methacrylate, polypropyl methacrylate, polybutyl methacrylate, polyglycidyl methacrylate or polyhydroxyethyl methacrylate; or an acrylic resin such as polymethyl acrylate, polyethyl acrylate, polypropyl acrylate, polybutyl acrylate, polyglycidyl acrylate, or polyhydroxyethyl acrylate. The resins (C) are not limited thereto. The resins (C) may be used alone or as an admixture thereof.

When baking the composition of the present invention with a substrate, the proportion of the VdF resin (A) is increased on the surface side of the film, and the proportion of the resin (B) is increased on the substrate side. Thus, the resin (B) is adhered to the substrate tightly and the resin (A) and the resin (B) are adhered each other by the resin (C). The thus obtained film has a structure such that the surface side is rich in the VdF resin (A) and the substrate side is rich in the resin (B).

The composition of the present invention is composed of 10 to 95 parts by weight of the resin (A), 1 to 80 parts by weight of the resin (B) and 1 to 30 parts by weight of the resin (C), the total amounts of the components (A), (B) and (C) being 100 parts by weight, preferably, 30 to 80 parts by weight of the resin (A), 5 to 60 parts by weight of the resin (B) and 10 to 15 parts by weight of the resin (C), the total amounts of the components (A), (B) and (C) being 100 parts by weight.

When the amount of the resin (C) is too small compared with that of the resin (B), that is, the amount is less than 1 part by weight, the delamination easily occurs between the resin (A) and the resin (B). On the other hand, when the amount of the resin (C) is too large, that is, the amount is more than 30 parts by weight, the properties such as the corrosion resistance and the weatherability of the obtained film are lowered. Also, when the amount of the VdF resin (A) is less than 10 parts by weight, the corrosion resistance is lowered, and on the other hand, when the amount is more than 95 parts by weight, the adhesion strength to the substrate is lowered. Further, when the amount of the resin (B) is less than 1 part by weight, the corrosion resistance is lowered since the amount of the resin (A) at the surface side of the film is decreased, and on the other hand, when the resin (B) is more than 80 parts by weight, the delamination easily occurs.

When the resin (B) and/or the resin (C) has functional groups, it is possible to cure the coating film by reacting the functional groups with a curing agent. In case that the functional group is glycidyl group or hydroxyl group, there can be used, as the curing agent, a polybasic carboxylic acid or its acid anhydride, an amino resin, a phenol resin, a polyfunctional isocyanate or blocked isocyanate, a melamine derivative, a complex of boron trifluoride, a polyhydric alcohol, or the like. In case that the functional group is an amino group, a methylolated amino group or an alkoxymethylolated amino group, there can be used, as the curing agent, an epoxy resin, a formaldehyde resin, a polyhydric alcohol, an anhydride of a polybasic acid, or the like.

The amount of the curing agent depends on the kinds of the resin (B), and is suitably decided depending on the used resin (B).

The composition of the present invention can be prepared by previously dispersing or dissolving the VdF resin (A) in a solvent, adding thereto the mixture of the resin (B) and the resin (C) dissolved in a solvent and mixing the resultant mixture by using a usual mixing machine such as ball mill or sand mill. During the preparation, it is preferable to maintain the temperature at not higher than 50° C. in order to avoid gelation of the VdF resin (A).

In the present invention, it is preferable that the amount of the solvent is from 40 to 85 parts by weight and the amount of the composition of the invention is from 15 to 60 parts by weight, the total amount of the solvent and the composition being 100 parts by weight. When the amount of the solvent is less than 40 parts by weight, the viscosity is increased, so it becomes hard to coat, thus resulting in impaired surface smoothness of the film. Also, it becomes one of causes of formation of cracks. On the other hand, when the amount of the solvent is more than 85 parts by weight, there occur problems that the coating ability is deteriorated, that is, the coating tends to produce runs due to lowering the viscosity of the coating, and the stability for storage becomes poor.

As the solvent, there can be used a latent solvent incapable of dissolving the VdF resin (A) at ordinary temperature but capable of dissolving it at high temperature of not less than 50° C., or a common solvent capable of dissolving the VdF resin (A) and the two resins (B) and (C) at ordinary temperature.

Examples of the latent solvent are, for instance, ketones, carboxylic acid esters, glycol ethers, glycol esters, cyclic ethers, carbonates, nitriles, and the like. Examples of the common solvent are, for instance, N-dimethylacetamide, dimethylformamide, dimethyl sulfoxide, pyrrolidone, γ-butyllactone, and the like. (These solvents are disclosed in Japanese Examined Patent Publications No. 18345/1972, No. 6176/1974 and No. 4176/1963, and the like.) The solvent may be used alone or as an admixture thereof. The solvent are not limited thereto.

To the composition of the invention, additives usually used for the VdF resin, e.g. a pigment such as metal oxides, can be added.

The mixture of the composition of the invention and the solvent can be applied to a substrate according to usual manners, such as brushing, dipping, impregnation, spraying and roller coating. After applying, the composition is baked usually with its substrate at a temperature of 80° to 300° C., preferably from 150° to 280° C. to form a sintered film on its substrate.

Any materials can be used as the substrates so long as the materials can resist the baking temperature. Examples of the substrates are, for instance, metals such as iron, stainless steel, copper and aluminum, inorganic materials such as ceramics, glass, marble, gypsum, asbestos, chinaware and brick, and the like. When applying the composition to the substrate, usually, primer coating is not required but may be conducted.

The composition of the invention is suitable for uses which require the corrosion resistance, the weatherability, and the like. For example, the composition can be used as coatings for buildings (such as roofs, walls, gates and sashes), building structure components, automobiles, bicycles, vessels (such as screws), household electric appliances (such as outdoor air conditioners and ventilation fans), chemical industrial goods (such as drum, tanks, towers, valves, pumps, pipes, plating tools, rolls, cylinders and heat exchangers), and it is used for other uses such as interior coatings of square cans or cans for sprays.

Further, when a polytetrafluoroethylene polymer such as polytetrafluoroethylene (PTFE), tetrafluoroethylene-perfluoroalkyl vinyl ether copolymer (PFA) or tetrafluoroethylene-hexafluoropropylene copolymer (FEP) is added to the composition of the invention, the mixture can be utilized for the use of mold-release, lubrication or the like.

The composition of the invention can provide films having an excellent recoatability, therefore, other fluororesins can be further coated on the film. Thus obtained film are more excellent in the weatherability, the corrosion resistance, and the like.

The film obtained by baking the composition of the present invention has the structure that the surface side is rich in the VdF resin, and the excellent adhesion to the substrate. Consequently, the film is superior to known VdF coatings in the weatherability, the corrosion resistance, and the like. The excellent adhesion of the film is also exhibited in its resistance to hot water.

The present invention is more specifically described and explained by means of the following Examples, in which all % and parts are by weight unless otherwise noted. It is to be understood that the present invention is not limited to the Examples, and various changes and modifications may by made in the invention without departing from the spirit and scope thereof.

EXAMPLE 1

A solvent mixture was prepared by mixing 70 parts of isophorone with 30 parts of dimethyl phthalate. To 55 parts of the solvent mixture was added 45 parts of a VdF resin (commercially available under the trade name "Neoflon VDF VP-850" manufactured by Daikin Industries, Ltd.) as the resin (A), and the mixture was stirred for 30 minutes at room temperature by using "Homo disper" (manufactured by Tokushu Kika Kogyo Kabushiki Kaisha) (4 m/s) to give a dispersion of the VdF resin.

In the same manner as above, a 40% solution of a bisphenol epoxy resin (commercially available under the trade name "Epicote 1009" manufactured by Shell Kagaku Kabushiki Kaisha) as the resin (B) was prepared.

An acrylic resin (commercially available under the trade name "LR-90" manufactured by Mitsubishi Rayon Co., Ltd.) as the resin (C) was mixed with the obtained dispersion of the VdF resin and the solution of the epoxy resin in a weight ratio (solid content) of the VdF resin (A), the epoxy resin (B) and the acrylic resin (C) of 70 parts : 10 parts : 20 parts, to which 7.5 parts of a phenol resin (commercially available under the trade name "Hitanol 4020" manufactured by Hitachi Chemical Co., Ltd.) was added as a curing agent, and the mixture was thoroughly stirred to give a coating composition. The obtained composition was spray-coated on an aluminum plate [A-1050P AM-712 specified in Japanese Industrial Standard (JIS) H 4000], which was baked at 200° C. for 10 minutes by using a hot air dryer to give a test piece. The thickness of the coated film was about 25 μm.

With respect to the test piece, the following tests were carried out. The results are shown in Table 1.

Adhesion strength (Cross-cut-test)

The coated film (10 mm × 10 mm) is so cross-cut by a lazer blade as to penetrate to the surface of the substrate into 100 squares (each square: 1 mm × 1 mm) and the adhesion of the film is measured according to JIS K 5400. The number of remaining squares/100 squares are counted.

Pencil hardness

The test is conducted according to JIS K 5400.

Chemical resistance

The test pieces are allowed to stand in a 5% hydrochloric acid solution, a 5% sodium hydroxide solution and acetone, respectively, at room temperature for two weeks, or in a 10% hydrogen peroxide solution at 60° C. for 5 days. The chemical resistance of the film is measured by using a film anticorrosion tester manufactured by Daiyu Kizai Kabushiki Kaisha, and is estimated according to the following criteria.

5: No change
4: The film is slightly discolored.
3: Gloss or color of the film is considerably changed.
2: Many cracks or blisters are generated.
1: Blisters are generated on all over the surface, or the film peels off from the aluminum plate.

Hot Water Resistance

After the test piece has been dipped, for four (4) days, in hot water having a temperature of 90° to 95° C., the adhesion of the coating was measured by the cross cut test according to JIS K 5400.

EXAMPLES 2 TO 9

The procedure of Example 1 was repeated except that resins (A), (B) and (C) and a curing agent shown in Table 1 were used in amounts shown in Table 1 to give a coating composition. A test piece was prepared and the adhesion strength, the pencil hardness and the chemical resistance were measured in the same manner as in Example 1.

The results are shown in Table 1.

TABLE 1

| Ex. No. | Resin (A) (part) | Resin (B) (part) | Resin (C) (part) | Curing agent (part) |
|---|---|---|---|---|
| 1 | PVdF[*1] (70) | Epicote 1009 (10) | LR-90 (20)[*7] | Hitanol 4020 (7.5) |
| 2 | PVdF[*1] (50) | Epicote 1009 (40) | LR-90 (10) | Hitanol 4020 (12.5) |
| 3 | PVdF[*1] (30) | Epicote 1009 (60) | LR-90 (10) | Hitanol 4020 (17.5) |
| 4 | PVdF[*1] (70) | Hitanol 4020 (10) | LR-90 (20) | — |
| 5 | PVdF[*1] (70) | Melan X-81[*2] (10) | LR-90 (20) | — |
| 6 | PVdF[*1] (70) | HI-600[*3] (10) | LR-90 (20) | — |
| 7 | VdF copolymer (1)[*4] (70) | Epicote 1009 (10) | LR-90 (20) | Hitanol 4020 (7.5) |
| 8 | VdF copolymer (2)[*5] (70) | Epicote 1009 (10) | LR-90 (20) | Hitanol 4020 (7.5) |
| 9 | VdF copolymer (3)[*6] (70) | Epicote 1009 (10) | LR-90 (20) | Hitanol 4020 (7.5) |

| Ex. No. | Adhesion strength (squares) | Hot water resistance strength | Pencil hardness | Chemical resistance | | | |
|---|---|---|---|---|---|---|---|
| | | | | 5% hydrochloric acid | 5% NaOH | Acetone | 10% $H_2O_2$ |
| 1 | 100/100 | 100/100 | 2H | 5 | 4 | 3 | 4 |
| 2 | 100/100 | 100/100 | 2H | 5 | 4 | 3 | 4 |
| 3 | 100/100 | 100/100 | 2H | 5 | 3 | 3 | 3 |
| 4 | 100/100 | 100/100 | 2H | 5 | 4 | 3 | 4 |
| 5 | 100/100 | — | 2H | 5 | 4 | 3 | 4 |
| 6 | 100/100 | 100/100 | 2H | 5 | 4 | 3 | 4 |
| 7 | 100/100 | 100/100 | 2H | 5 | 4 | 3 | 4 |

TABLE 1-continued

| 8 | 100/100 | 100/100 | 2H | 5 | 4 | 3 | 4 |
| 9 | 100/100 | 100/100 | 2H | 5 | 4 | 3 | 4 |

(Notes)
*¹Neoflon VDF VP-850 (manufactured by Daikin Industries Ltd.)
*²A melamine-benzoguanamine resin commercially available from Hitachi Chemical Co., Ltd.
*³A polyamide imide resin commercially available from Hitachi Chemical Co., Ltd.
*⁴A copolymer of VdF and tetrafluoroethylene in a molar ratio of 80/20
*⁵A copolymer of VdF and hexafluoropropylene in a molar ratio of 95/5
*⁶A copolymer of VdF and chlorotrifluoroethylene in a molar ratio of 90/10
*⁷The acrylic resin "LR-90" used as the component (C) which is a copolymer of methyl methacrylate and ethyl acrylate.

Comparative Examples 1 to 4

The procedure of Example 1 was repeated except that resins (A), (B) and (C) and a curing agent shown in Table 2 were used in amounts shown in Table 2 to give a coating composition. A test piece was prepared and the adhesion strength, the pencil hardness and the chemical resistance were measured in the same manner as in Example 1.

The results are shown in Table 2.

TABLE 2

| Com. Ex. No. | Resin (A) (part) | Resin (B) (part) | Resin (C) (part) | Curing agent (part) | Adhesion strength (squares) | Pencil hardness | Chemical resistance 5% hydrochloric acid | 5% NaOH | Acetone | 10% $H_2O_2$ |
| --- | --- | --- | --- | --- | --- | --- | --- | --- | --- | --- |
| 1 | PVdF (50) | Epicote 1009 (50) | — | Hitanol 4020 (12.5) | 0/100 | — | — | — | — | — |
| 2 | PVdF (50) | — | LR-90 (50) | Hitanol 4020 (12.5) | 100/100 | 3H | 4 | 2 | 2 | 1 |
| 3 | PVdF (100) | — | — | — | 0/100 | — | — | — | — | — |
| 4 | — | Epicote 1009 (100) | — | — | 100/100 | 4H | 4 | 2 | 3 | 1 |

(Note)
In Comparative Examples 1 and 3, the adhesion strength was so poor that the test of the pencil hardness and the test of the chemical resistance were not conducted.

In addition to the ingredients used in the Examples, other ingredients can be used in the Examples as set forth in the specification to obtain substantially the same results.

What we claim is:

1. A vinylidene fluoride resin composition which comprises:
   (A) 30 to 80 parts by weight of a vinylidene fluoride resin containing not less than 75% by weight of vinylidene fluoride units,
   (B) 5 to 60 parts by weight of at least one resin selected from the group consisting of an epoxy resin, a phenol resin, an alkyd resin, a polyamide resin, and a vinyl chloride resin, and
   (C) 10 to 20 parts by weight of a resin comprising at least one acrylic resin selected from the group consisting of polymethyl methacrylate, polyethyl methacrylate, polypropyl methacrylate, polybutyl methacrylate, polyhydroxyethyl methacrylate, polymethyl acrylate, polyethyl acrylate, polypropyl acrylate, polybutyl acrylate, and polyhydroxyethyl acrylate;
the total weight amount of said resins (A), (B) and (C) being 100 parts by weight.

2. The composition of claim 1, wherein said vinylidene fluoride resin (A) is a homopolymer of vinylidene fluoride.

3. The composition of claim 1, wherein said vinylidene fluoride resin (A) is a copolymer of vinylidene fluoride and an ethylenically unsaturated compound.

4. The composition of claim 3, wherein said ethylenically unsaturated compound is a member selected from the group consisting of ethylene, styrene, propylene, isobutylene, vinyl chloride, vinylidene chloride, vinyl fluoride, chlorodifluoroethylene, chlorotrifluoroethylene, tetrafluoroethylene, trifluoroethylene, trifluoropropylene, hexafluoropropylene, vinyl formate, vinyl acetate, vinyl propionate, vinyl butylate, acrylic acid, methacrylic acid, methyl methacrylate, methyl acrylate, allyl methacrylate, acrylonitrile, N-butyl methacrylamide, allyl acetate and isopropenyl acetate.

5. An article comprising a substrate having baked on a surface thereof a vinylidene fluoride composition as claimed in claim 1 such as to provide an adherent coating on said surface comprising said component (A) predominantly proximate to an exposed surface of said coating, and said component (B) predominantly in that portion of the coating proximate to said substrate.

6. A composition as claimed in claim 1, which, upon baking at about 80° to 300° C., cures to a sintered film in which component (A) predominates proximate to one surface of said film and component (B) predominates proximate to the opposite surface of said film.

7. A film having the composition claimed in claim 1 wherein the portion thereof proximate to one surface predominates in said component (A) and the portion thereof proximate to the opposite surface thereof predominates in said component (B).

* * * * *